US012293503B2

(12) United States Patent
Liu et al.

(10) Patent No.: US 12,293,503 B2
(45) Date of Patent: May 6, 2025

(54) METHOD AND APPARATUS FOR DETERMINING OPTICAL DISTORTION OF AN OBJECT FROM A SINGLE IMAGE

(71) Applicant: THE BOEING COMPANY, Chicago, IL (US)

(72) Inventors: Xue Liu, Maryland Heights, MO (US); David J. Sundquist, O'Fallon, MO (US); Matthew Mark Thomas, Maryland Heights, MO (US); Steven M. Volz, Alton, IL (US); Hui Lin Yang, Derwood, MD (US)

(73) Assignee: The Boeing Company, Arlington, VA (US)

( * ) Notice: Subject to any disclaimer, the term of this patent is extended or adjusted under 35 U.S.C. 154(b) by 552 days.

(21) Appl. No.: 17/652,134

(22) Filed: Feb. 23, 2022

(65) Prior Publication Data
US 2022/0343487 A1 Oct. 27, 2022

Related U.S. Application Data

(60) Provisional application No. 63/201,164, filed on Apr. 15, 2021.

(51) Int. Cl.
*G06K 9/00* (2022.01)
*G06T 7/00* (2017.01)

(52) U.S. Cl.
CPC .. *G06T 7/0004* (2013.01); *G06T 2207/30108* (2013.01)

(58) Field of Classification Search
CPC ................ G06T 7/0004; G06T 2207/30108
See application file for complete search history.

(56) References Cited

U.S. PATENT DOCUMENTS 4,776,692 A * 10/1988 Kalawsky .............. G01M 11/00
356/239.1
5,694,479 A * 12/1997 Guering ............... G01N 21/958
356/392

(Continued)

OTHER PUBLICATIONS

Harris, James S., Keven G. Harding, and Steven H. Mersch. "Techniques for Evaluation of Aircraft Windscreen Optical Distortion." Optics in Metrology and Quality Assurance. vol. 220. SPIE, 1980. (Year: 1980).*

(Continued)

*Primary Examiner* — Avinash Yentrapati
(74) *Attorney, Agent, or Firm* — Harrity & Harrity, LLP

(57) ABSTRACT

A method is provided for measuring and quantifying optical distortion of a transparent object using a single image. Embodiments provided herein include a method including: receiving an image of an object and a transparent object, where the object is visible through the transparent object, where a portion of the image of the object is visible through the transparent object is an inside region of interest (iROI), where a portion of the image of the object not viewed through the transparent object is an outside region of interest (oROI); determining measured pixel locations for a plurality of identified pixels in the image, the plurality of identified pixels corresponding to the distinct points in the image; calculating virtual locations in the image representing the distinct points within the iROI; determining, for respective distinct points within the iROI, differences between the virtual location and the measured pixel location.

20 Claims, 15 Drawing Sheets

(56) References Cited

U.S. PATENT DOCUMENTS

| | | | |
|---|---|---|---|
| 7,899,236 B2* | 3/2011 | Freeman | G06V 10/754 |
| | | | 382/141 |
| 2010/0086191 A1* | 4/2010 | Freeman | G06V 10/754 |
| | | | 382/141 |

OTHER PUBLICATIONS

Russell, E.W., "Glazing of Aircraft," Modern Plastics, 30(7): 119-120, 122, 124, 180, 182-184, (Mar. 1953).
Williamson, Fred L., "Streamlined Eye Section for B-29," Modern Plastics, 22(4): 95, 148, 200, 202, (Dec. 1944).

* cited by examiner

METHOD AND APPARATUS FOR DETERMINING OPTICAL DISTORTION OF AN OBJECT FROM A SINGLE IMAGE

CROSS-REFERENCE TO RELATED APPLICATIONS

This application claims priority to U.S. Provisional Patent Application No. 63/201,164, filed on Apr. 15, 2021, the contents of which are hereby incorporated by reference in their entirety.

TECHNOLOGICAL FIELD

Example embodiments of the present invention relate generally to determining optical distortion, and more particularly, to measuring and quantifying optical distortion of a transparent object using a single image.

BACKGROUND

Optical distortion in windshields, canopies, and flight deck windows of vehicles poses issues for occupants of the vehicle. Optical distortion can produce effects akin to a funhouse mirror, though instead of through reflection, the distortion is through transmission. Such distortion in a windshield or aircraft canopy or flight deck window can induce disorientation or illness (e.g., headaches, nausea, etc.) for an occupant, pilot, or driver of a vehicle. Such distortion is particularly problematic on windshields and canopies that include complex curvatures, such as canopies on military aircraft (e.g., fighter jets), aircraft windshields, or windshields that resemble aircraft canopies, as may be found on race cars and on some recreational machines.

In order to improve visibility through windshields and canopies, the amount of optical distortion has to be measured and quantified such that improvements can also be measured and quantified. The measurement of optical distortion is difficult and inefficient, such that improvements are difficult to quantify. With improvements being difficult to quantify, adjustments to manufacturing processes is difficult to assess, while trial-and-error methods of manufacturing are costly and inefficient.

BRIEF SUMMARY

Accordingly, a method, apparatus, and computer program product are provided for determining optical distortion, and more particularly, to measuring and quantifying optical distortion of a transparent object using a single image. Embodiments provided herein include a method including: receiving an image of an object of known geometry and a transparent object, where the object of known geometry has distinct points and is visible through the transparent object, where a portion of the image of the object of known geometry is visible through the transparent object is an inside region of interest (iROI), where a portion of the image of the object of known geometry not viewed through the transparent object is an outside region of interest (oROI); determining measured pixel locations for a plurality of identified pixels in the image, the plurality of identified pixels corresponding to the distinct points of the object of known geometry in the image; calculating virtual locations in the image representing the distinct points of the object of known geometry within the iROI; determining, for respective distinct points of the object of known geometry within the iROI, differences between the virtual location and the measured pixel location; and establishing optical distortion of the transparent object based on the differences between the virtual locations and the measured pixel locations of the distinct points.

The virtual locations in the image representing the distinct points of the object of known geometry within the iROI, in some embodiments include locations in the image where the distinct points of the object of known geometry would be located if the transparent object was not present in the image. Calculating virtual locations in the image representing the distinct points of the object of known geometry within the iROI includes, in some embodiments, performing a least squares fit of intersecting lines based on measured pixel locations for the plurality of identified pixels in the image in the oROI. The object of known geometry includes, in some embodiments, a grid board having a plurality of perpendicular gridlines intersecting at gridline intersection points, where the distinct points include gridline intersection points.

According to some embodiments, performing a least squares fit of intersecting lines based on measured pixel locations for the plurality of identified pixels in the image in the oROI includes performing a least squares fit of the gridlines to establish gridline intersection points within the iROI as the virtual locations in the image representing the gridline intersection points. Methods may include minimizing distortion of a lens of an image capture device having captured the image of the object of known geometry before determining measured pixel locations. According to some embodiments, the differences between the virtual location and the measured pixel location include vectors, each vector having a magnitude defining a degree of distortion and a direction defining a direction of the distortion.

Embodiments provided herein include an apparatus including at least one processor and at least one non-transitory memory including computer program code instructions, the computer program code instructions configured to, when executed, cause the apparatus to at least: receive an image of an object of known geometry and a transparent object, wherein the object of known geometry includes distinct points and is visible through the transparent object, where a portion of the image of the object of known geometry visible through the transparent object is an inside region of interest (iROI) and where a portion of the image of the object of known geometry not viewed through the transparent object is an outside region of interest (oROI); determine measured pixel locations for a plurality of identified pixels in the image, the plurality of identified pixels corresponding to the distinct points of the object of known geometry in the image; calculate virtual locations in the image representing the distinct points of the object of known geometry within the iROI; determine, for respective distinct points of the object of known geometry within the iROI, differences between the virtual location and the measured pixel location; and establish optical distortion of the transparent object based on the differences between the virtual locations and the measured pixel locations of the distinct points.

According to some embodiments, the virtual locations in the image representing the distinct points of the object of known geometry within the iROI include locations in the image where the distinct points of the object of known geometry would be located if the transparent object was not present. Causing the apparatus of some embodiments to calculate virtual locations in the image representing the distinct points of the object of known geometry within the iROI includes causing the apparatus to perform a least squares fit of intersecting lines based on measured pixel locations for the plurality of identified pixels in the image of the oROI. The object of known geometry, in some embodiments, includes a grid board having a plurality of perpendicular gridlines intersecting at gridline intersection points, where the distinct points include gridline intersection points.

According to some embodiments, causing the apparatus to perform a least squares fit of intersecting lines based on measured pixel locations for the plurality of identified pixels in the image in the oROI includes causing the apparatus to perform a least squares fit of the gridlines to establish virtual gridline intersection points within the iROI as the virtual locations in the image representing the gridline intersection points. Example embodiments include causing the apparatus to minimize distortion of a lens of an image capture device having captured the image of the object of known geometry before determining measured pixel locations. The differences between the virtual location and the measured pixel locations include, in some embodiments, vectors where each vector has a magnitude defining a degree of distortion and a direction defining a direction of the distortion.

Embodiments provided herein include a computer program product having at least one non-transitory computer-readable storage medium with computer-executable program code instructions stored therein, the computer-executable program code instructions including program code instructions to: receive an image of an object of known geometry and a transparent object, where the object of known geometry includes distinct points and is visible through the transparent object, where a portion of the image of the object of known geometry visible through the transparent object is an inside region of interest (iROI), and where a portion of the image of the object of known geometry not viewed through the transparent object is an outside region of interest (oROI); determine measured pixel locations for a plurality of identified pixels in the image, the plurality of identified pixels corresponding to the distinct points of the object of known geometry in the image; calculate virtual locations in the image representing the distinct points of the object of known geometry within the iROI; determine, for respective distinct points of the object of known geometry within the iROI, differences between the virtual location and the measured pixel location; and establish optical distortion of the transparent object based on the differences between the virtual locations and the measured pixel locations of the distinct points.

According to some embodiments, the virtual locations in the image representing the distinct points of the object of known geometry within the iROI include locations in the image where the distinct points of the object of known geometry would be located if the transparent object was not present. The program code instructions to calculate virtual locations in the image representing the distinct points of the object of known geometry within the iROI include, in some embodiments, program code instructions to perform a least squares fit of intersecting lines based on measured pixel locations for the plurality of identified pixels in the image in the oROI.

The object of known geometry, in some embodiments, includes a grid board having a plurality of perpendicular gridlines intersecting at gridline intersection points, where the distinct points include gridline intersection points. According to some embodiments, the program code instructions to perform a least squares fit of intersecting lines based on measured pixel locations for the plurality of identified pixels in the image in the oROI include program code instructions to perform a least squares fit of the gridlines to establish virtual gridline intersection points within the iROI as the virtual locations in the image representing the gridline intersection points. Some embodiments include program code instructions to minimize distortion of a lens of an image capture device having captured the image of the object of known geometry before determining the measured pixel locations.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
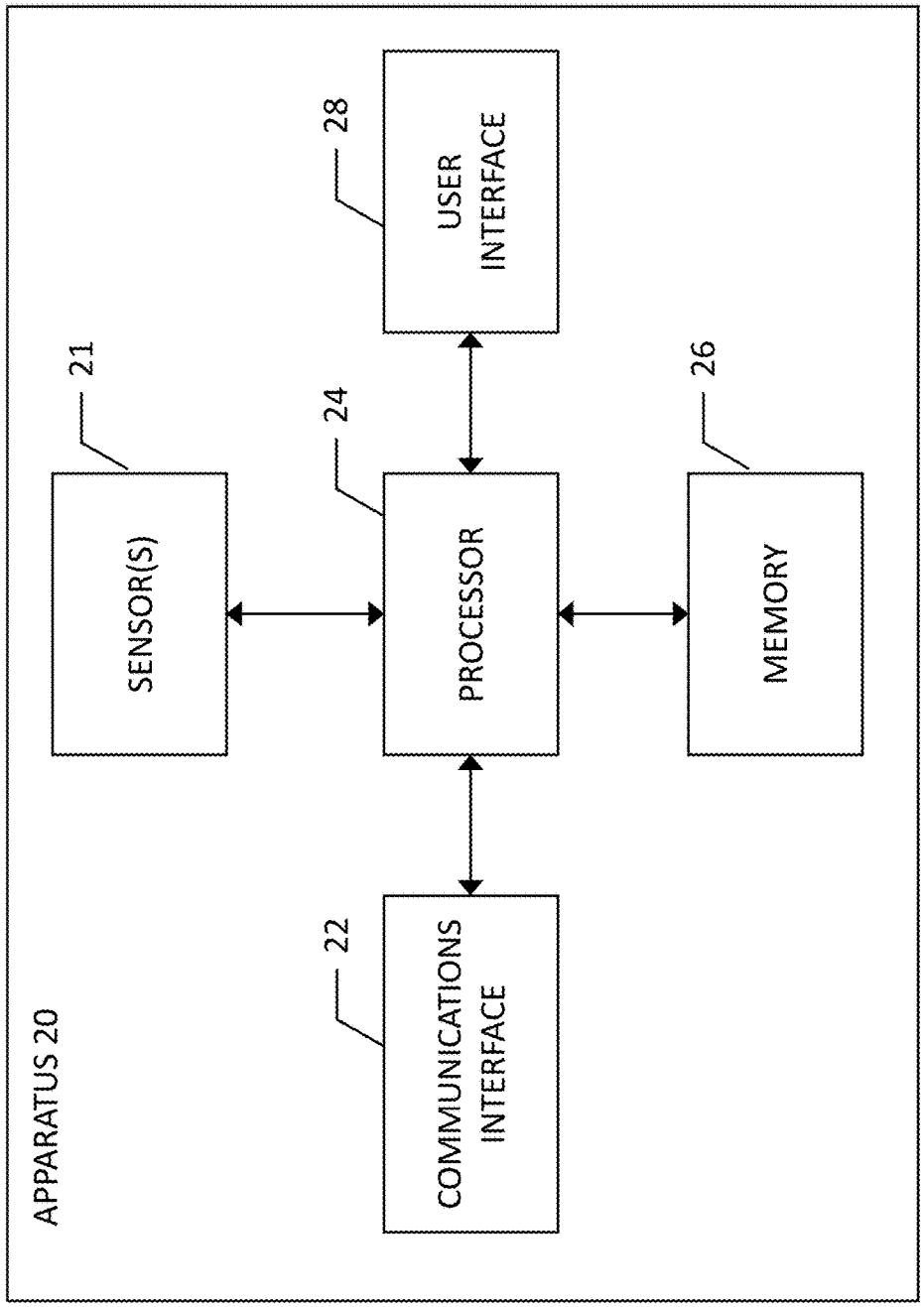
Figure 2:
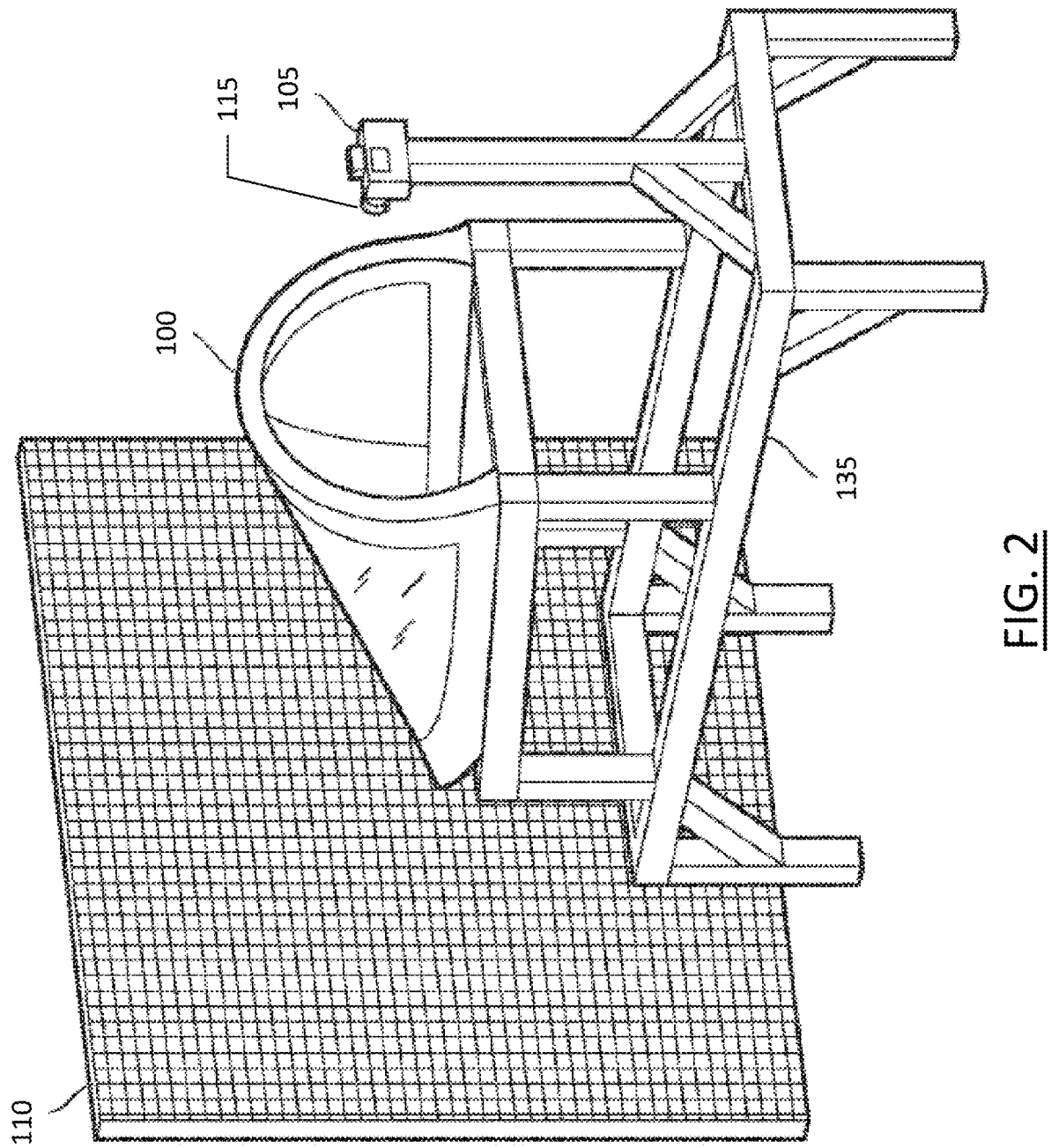
Figure 3:
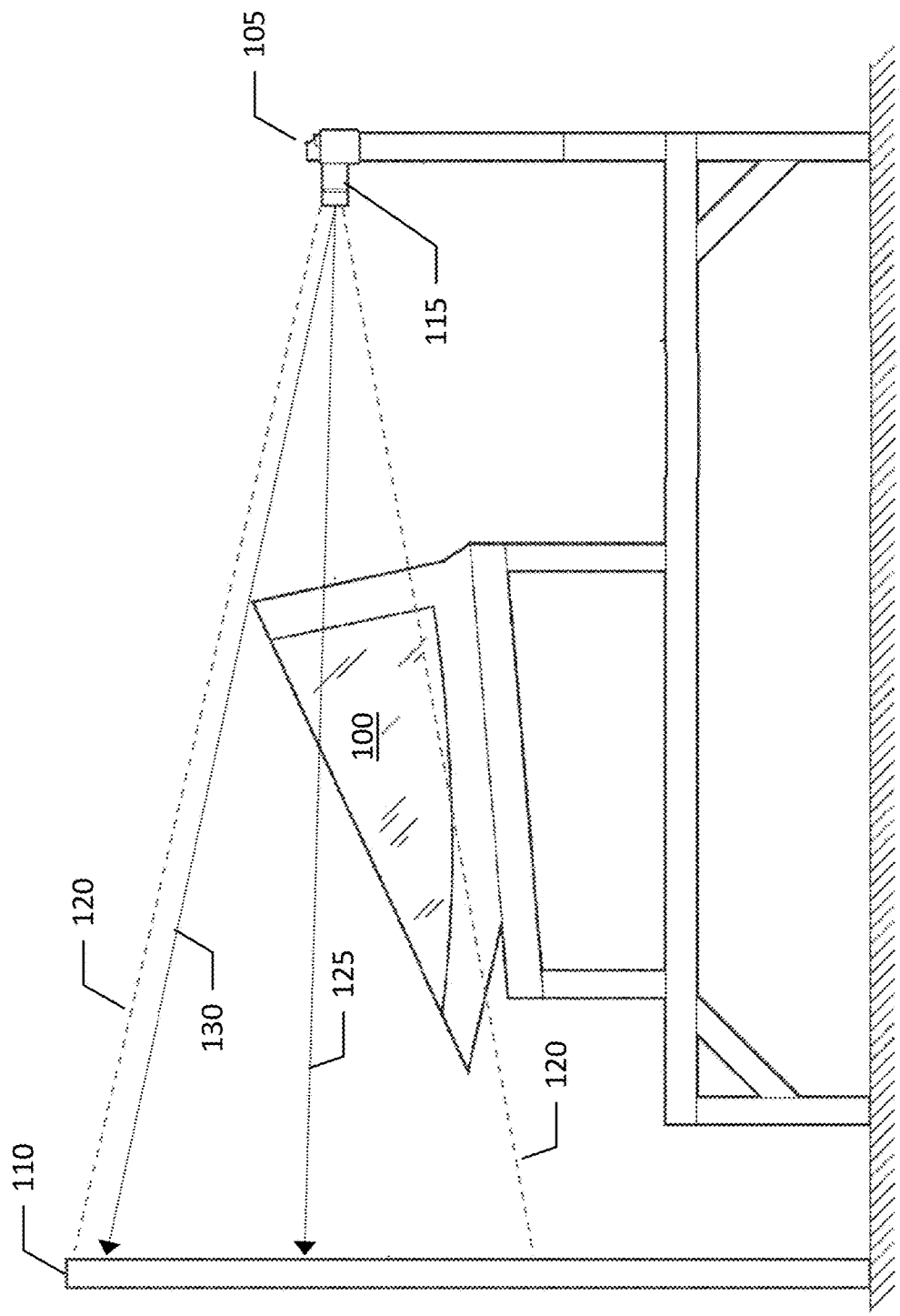
Figure 4:
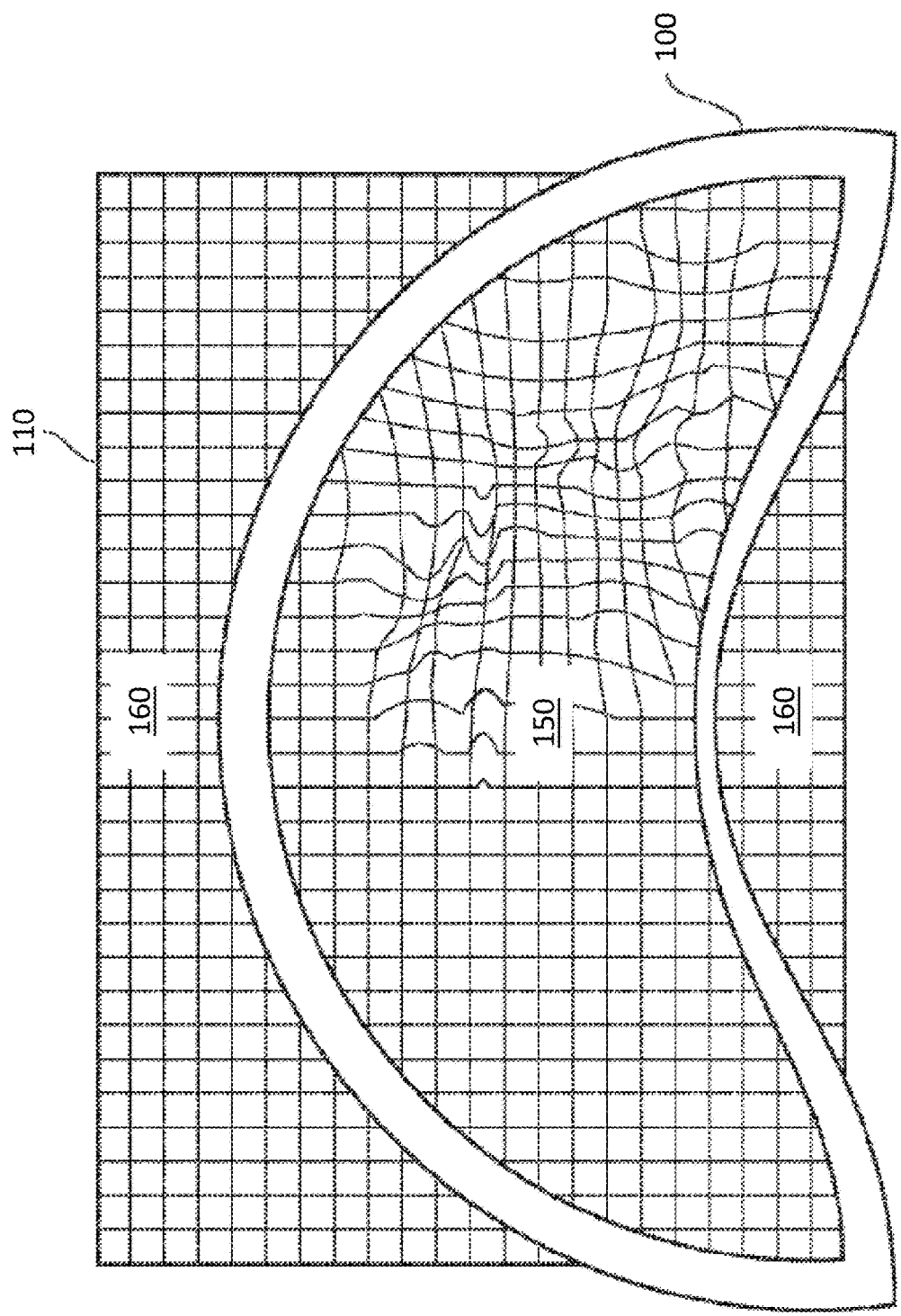
Figure 5:
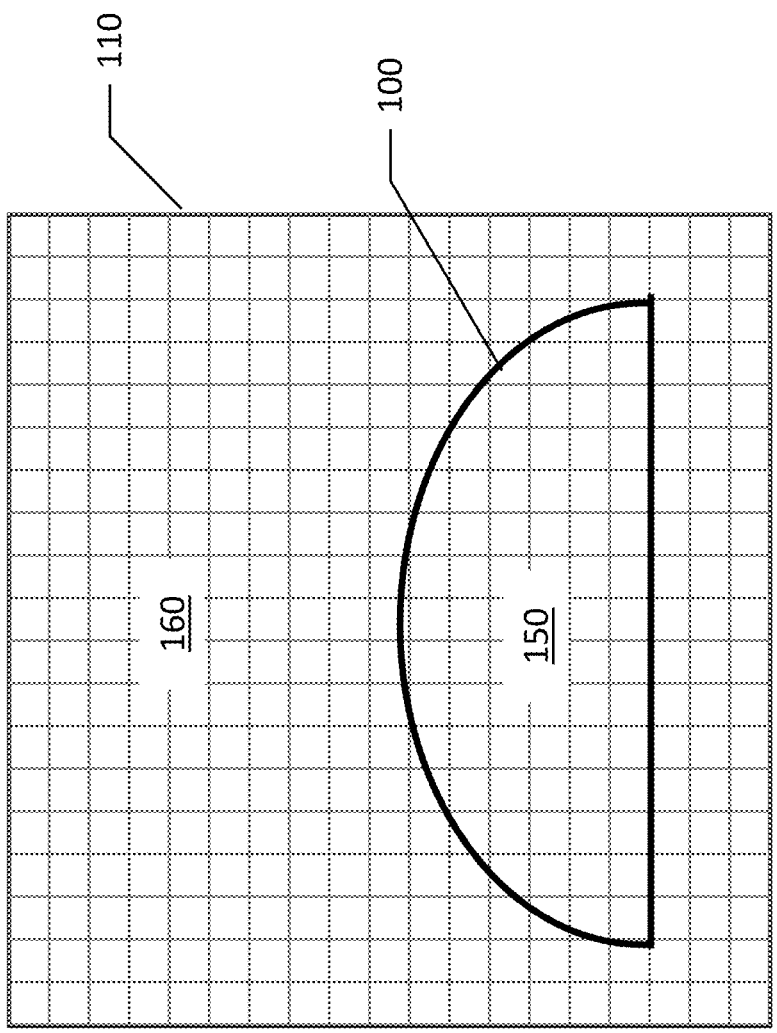
Figure 6:
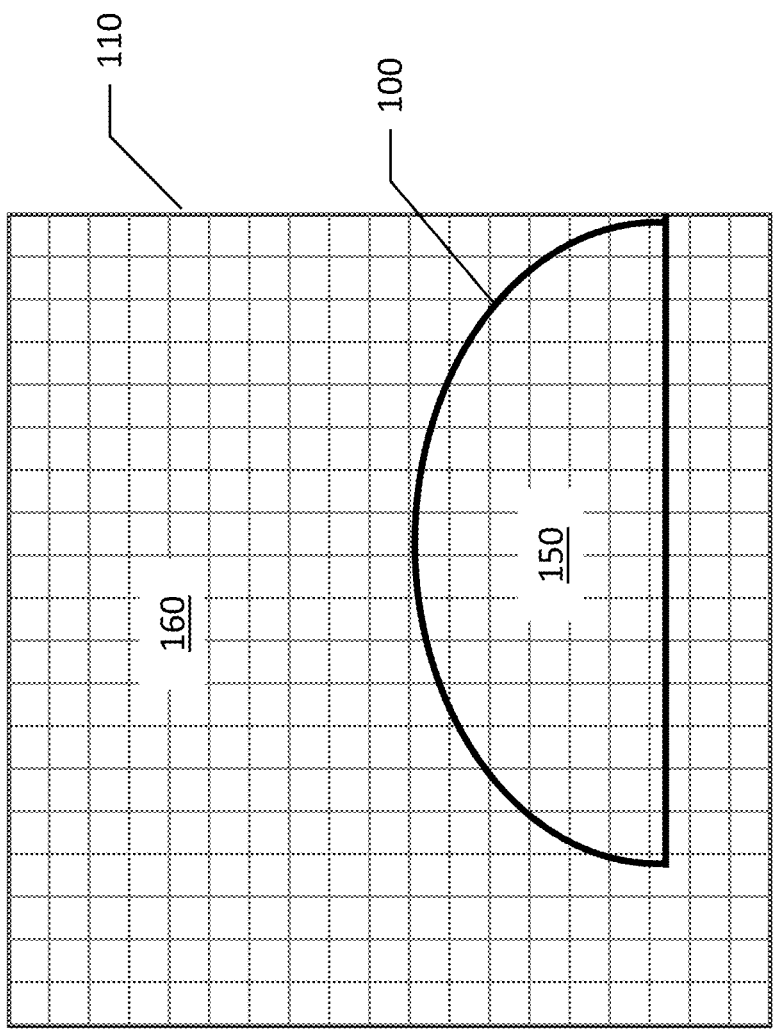
Figure 7:
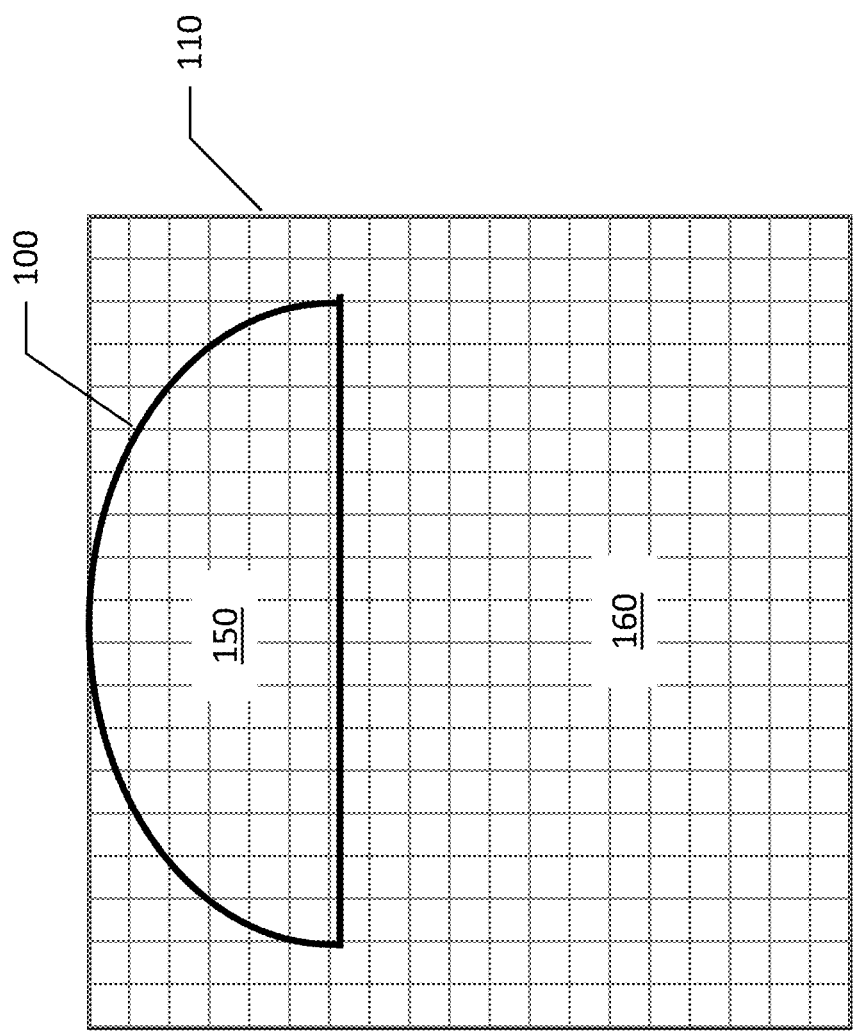
Figure 8:
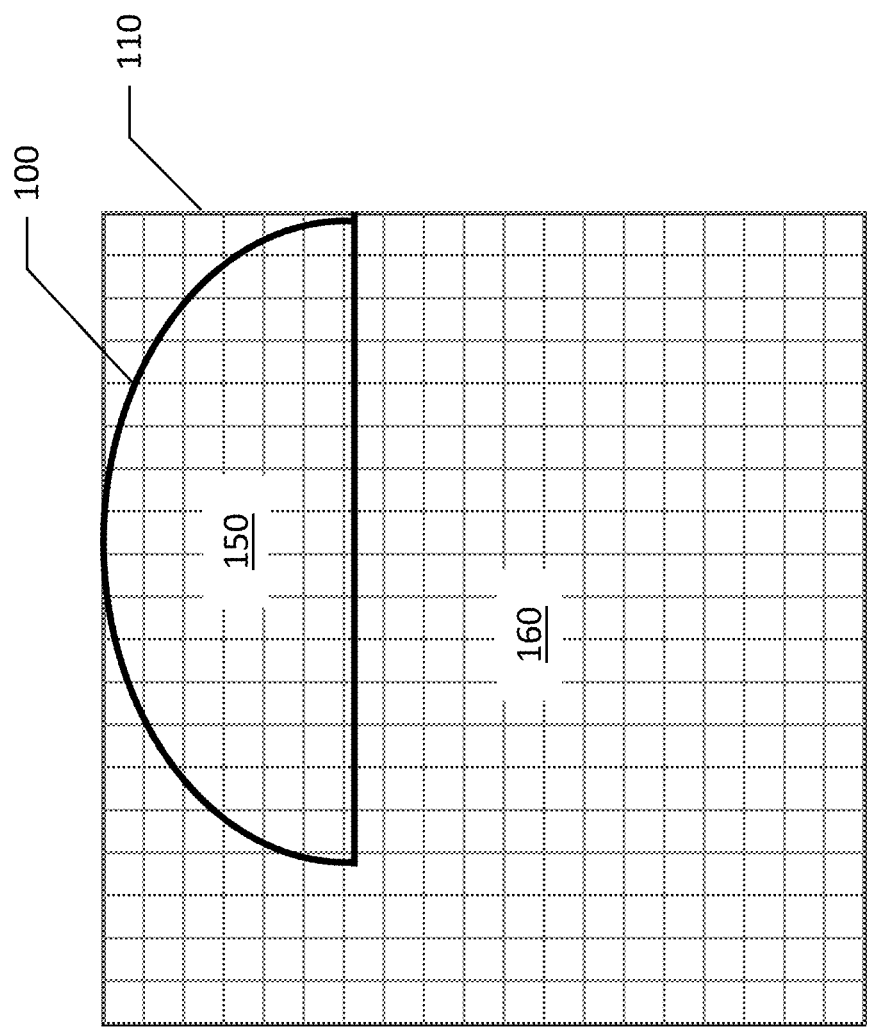
Figure 9:
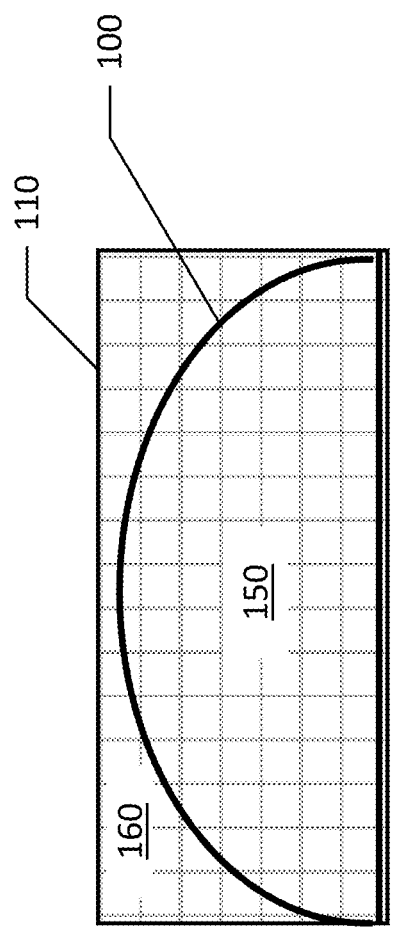
Figure 10:
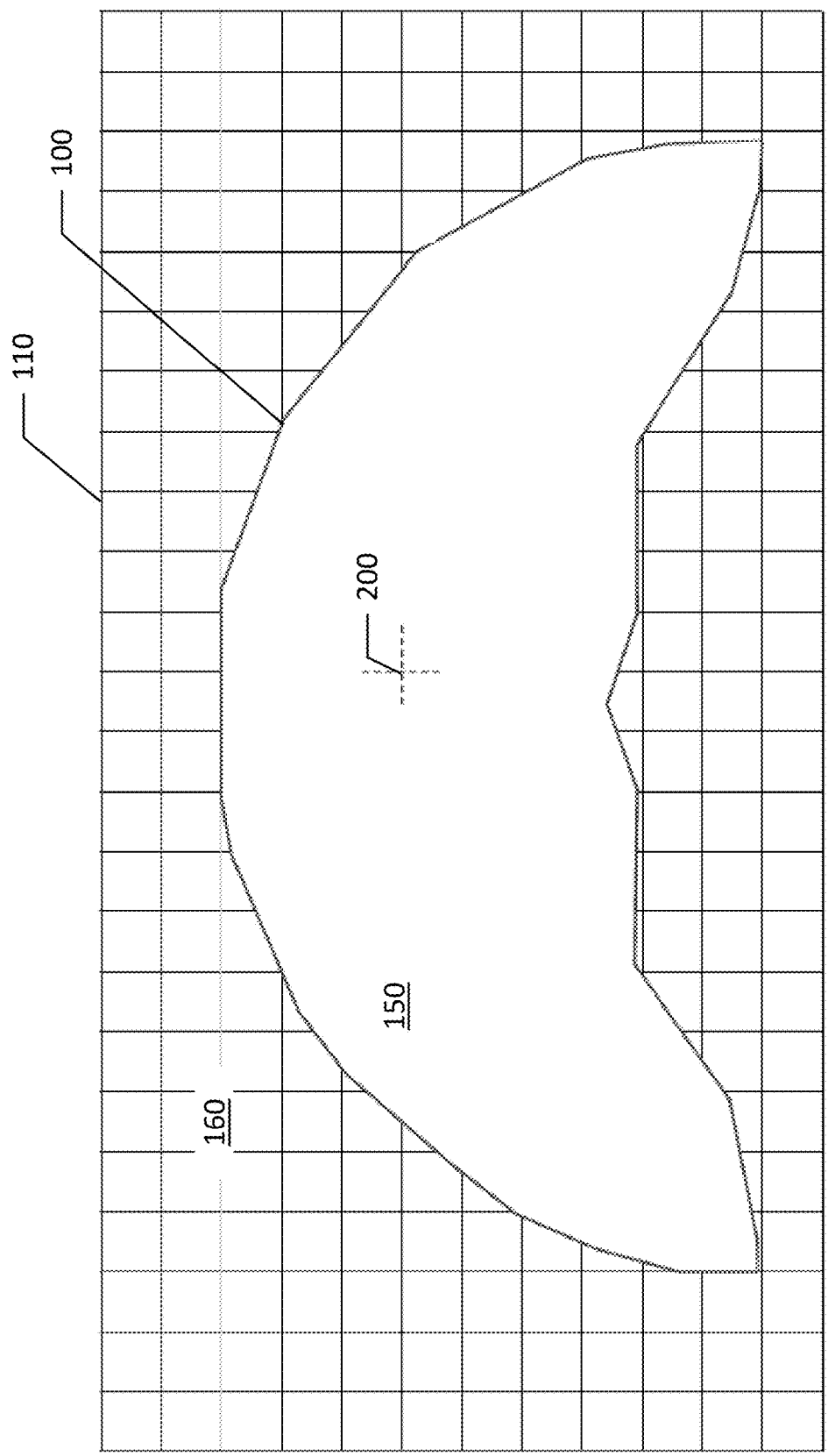
Figure 11:
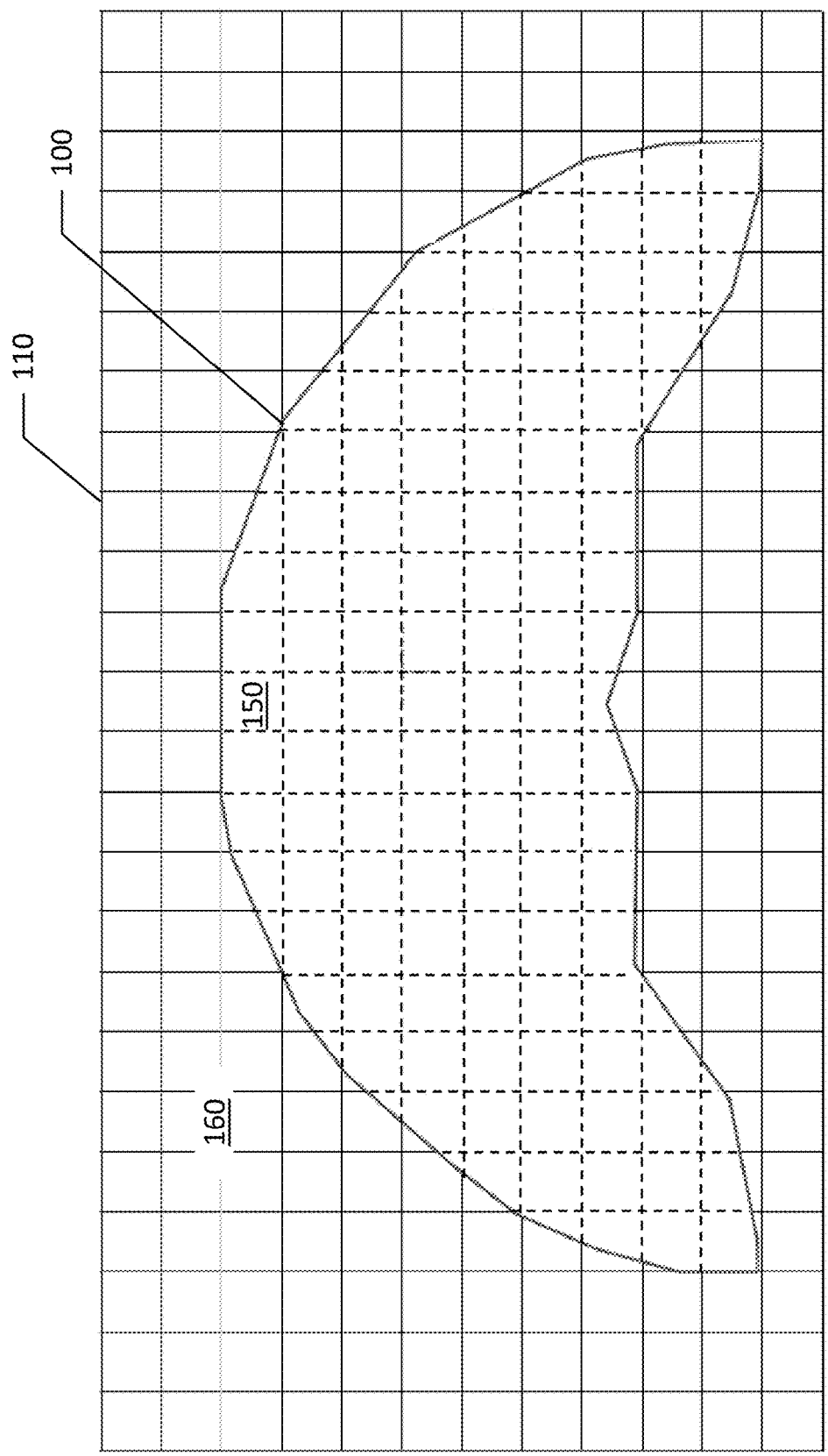
Figure 12:
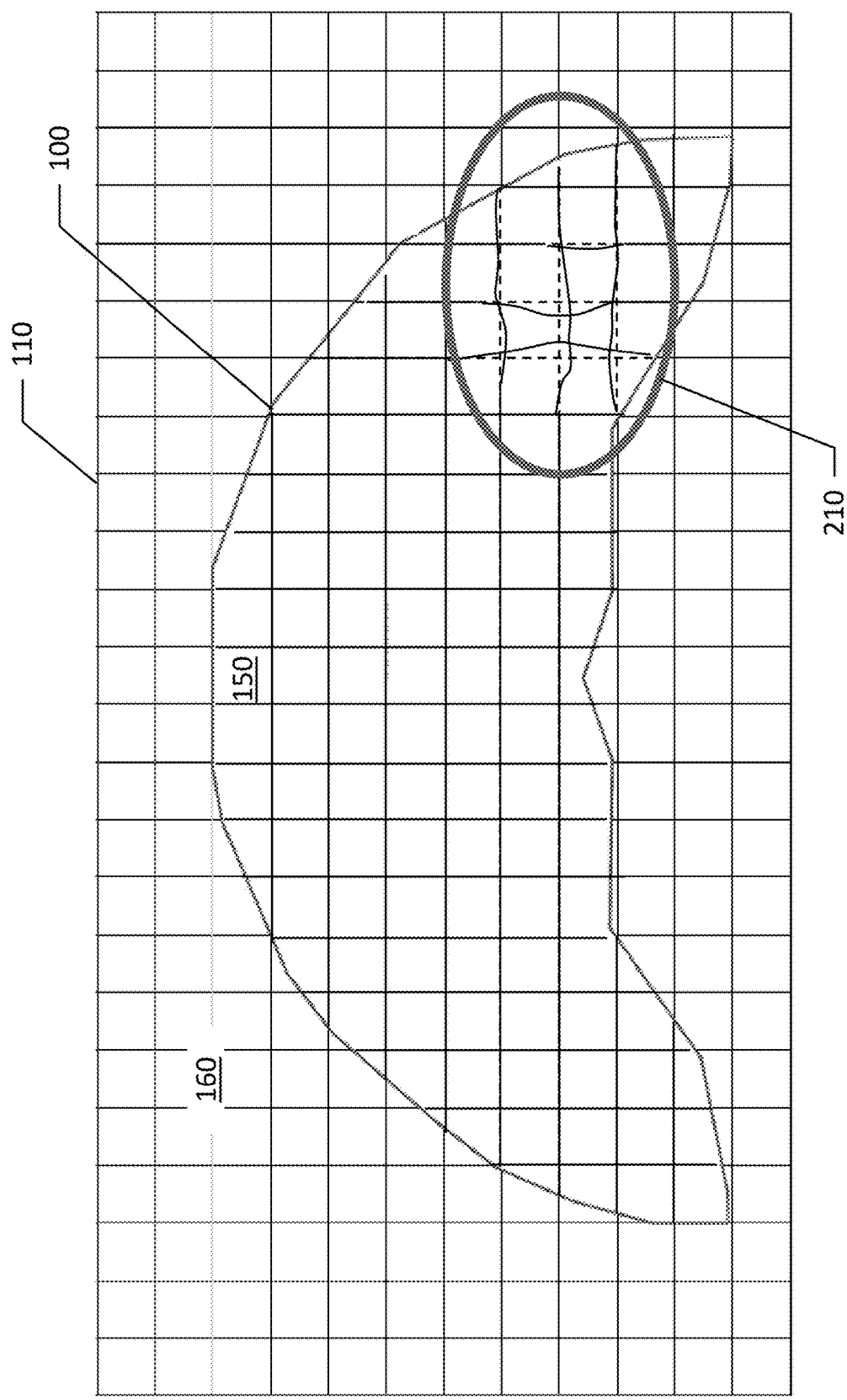
Figure 13:
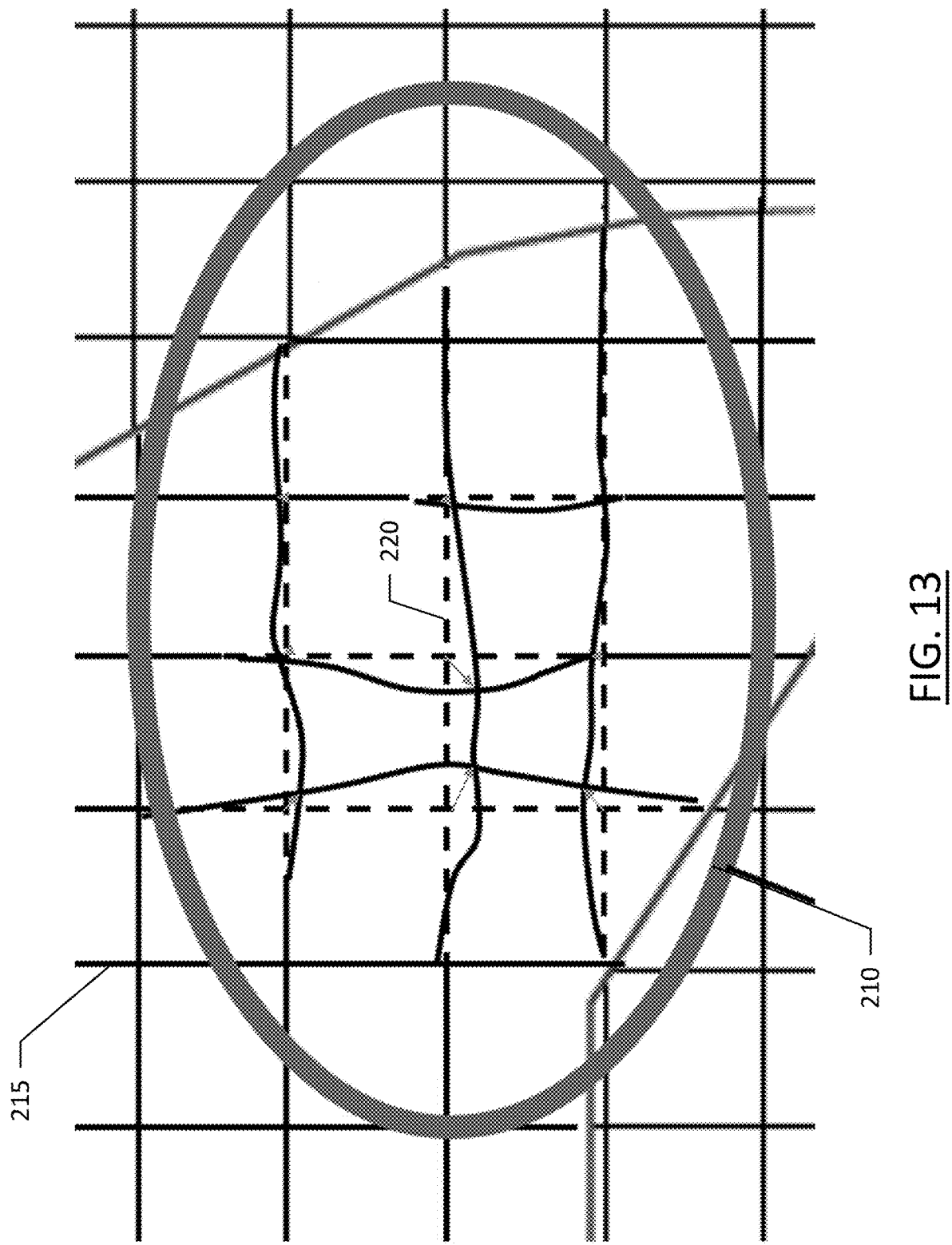
Figure 14:
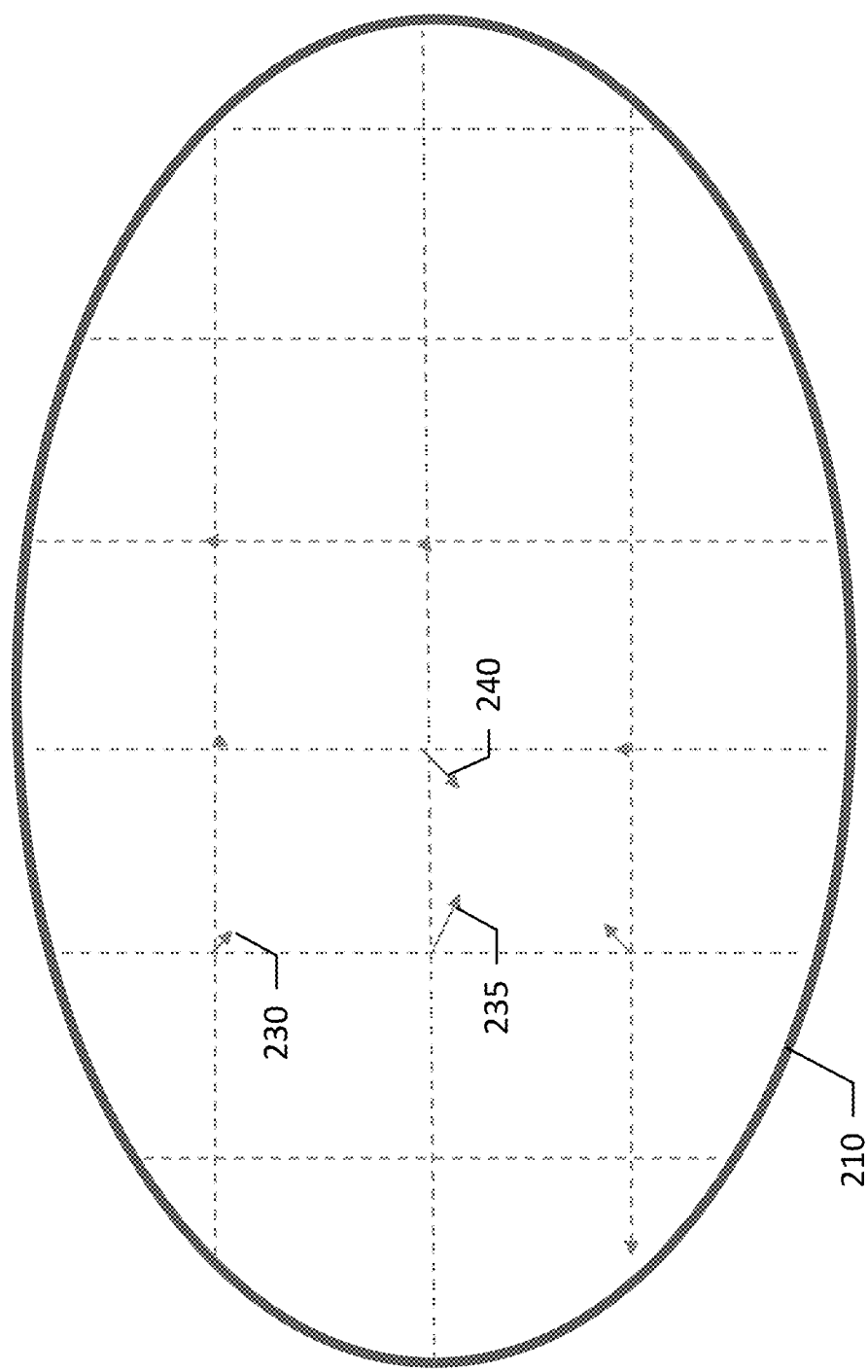
Figure 15:
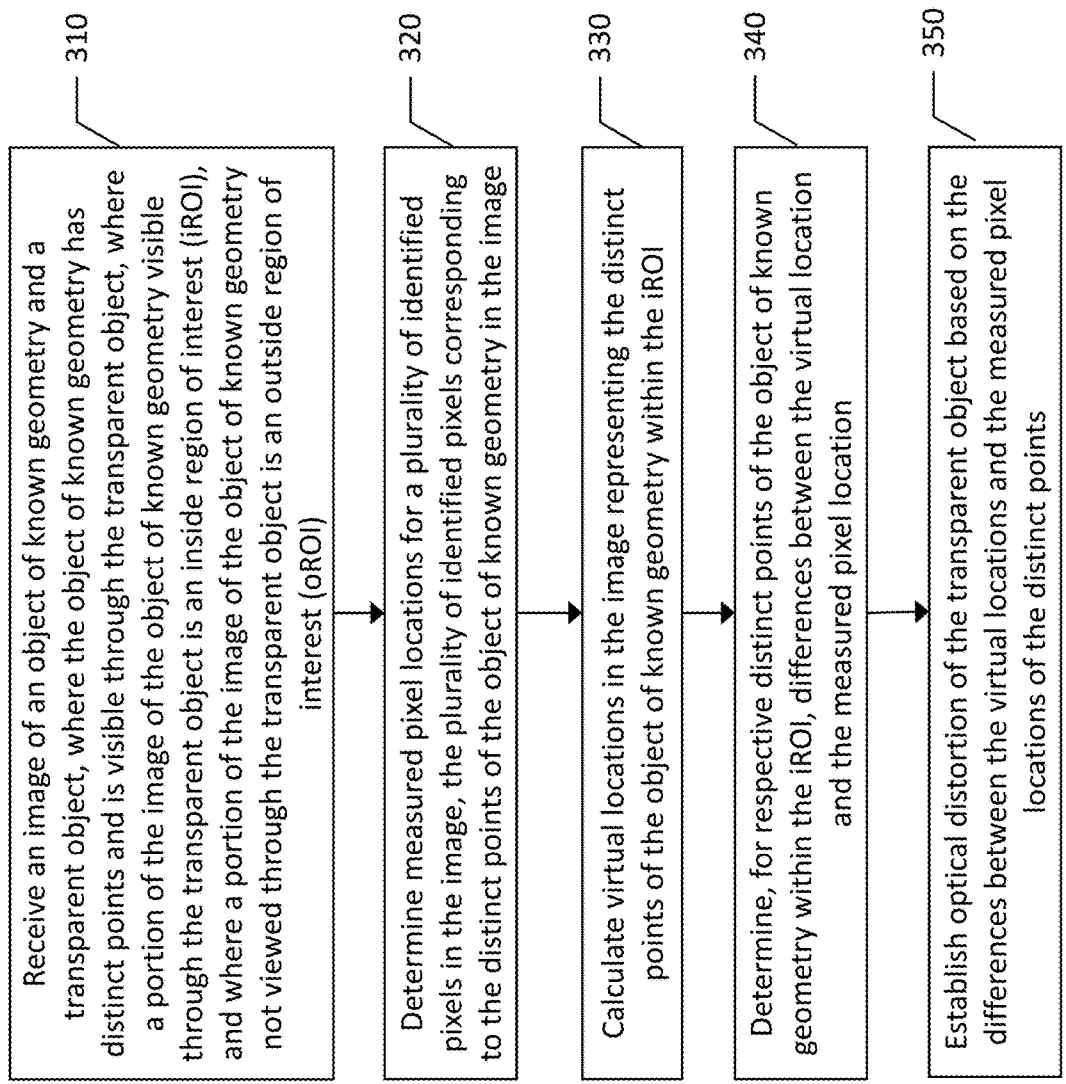

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 illustrates an example system for quantifying and measuring distortion of a transparent object according to an example embodiment of the present disclosure;

FIG. 3 illustrates the system of FIG. 2 in profile illustrating the sight lines of the image capture device according to an example embodiment of the present disclosure;

FIG. 4 illustrates the system of FIGS. 2 and 3 as shown from the viewpoint of the image capture device according to an example embodiment of the present disclosure; and FIG. 5 illustrates an image of a transparent object captured in front of an object of known geometry according to an example embodiment of the present disclosure;

FIG. 6 illustrates another image of a transparent object captured in front of an object of known geometry according to an example embodiment of the present disclosure;

FIG. 7 illustrates another image of a transparent object captured in front of an object of known geometry according to an example embodiment of the present disclosure;

FIG. 8 illustrates another image of a transparent object captured in front of an object of known geometry according to an example embodiment of the present disclosure FIG. 9 illustrates another image of a transparent object captured in front of an object of known geometry according to an example embodiment of the present disclosure FIG. 10 illustrates a grid board object of known geometry and a transparent object with the gridlines in the iROI removed for illustrative purposes according to an example embodiment of the present disclosure;

FIG. 11 illustrates the arrangement of FIG. 10 with a virtual gridline intersection according to an example embodiment of the present disclosure;

FIG. 12 illustrates measured gridlines shown in solid lines superimposed over virtual gridlines within the iROI illustrated in dashed lines according to an example embodiment of the present disclosure;

FIG. 13 illustrates a detail view of a distorted portion of the transparent object according to an example embodiment of the present disclosure;

FIG. 14 illustrates the detail view of the distorted portion of the transparent object with the image captured gridlines removed according to an example embodiment of the present disclosure; and FIG. 15 is a flowchart of a method for measuring and quantifying optical distortion of a transparent object using a single image according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Transparent materials formed with curvatures such as aircraft windshields distort light and can cause problems with controlling a vehicle, such as by causing illness to a pilot looking through the windshield. Measuring and quantifying optical distortion of windshields have relied on two images including an image of a grid board with and without the windshield in place. While this technique may be effective, this process requires two images and can be inefficient.

A method and apparatus are provided in accordance with an example embodiment of the present invention for calculating light distortion through a transparent material using only a single image. Embodiments define regions that are either within a region of interest or outside of the region of interest. A combination of horizontal and vertical pixels are then used in conjunction with set equations. Based on the results of the equations, the extent of the distortion can be calculated and a transparent item can be either accepted or rejected based on the permissible level of distortion. The use of a single image improves efficiency and repeatability while increasing throughput of a system designed according to example embodiments described herein for quantifying and measuring optical distortion.

Embodiments described herein use a single-photograph approach to measure and quantify optical distortion. Embodiments achieve this by following a process that uses equations to compare a measured grid with a virtual grid to determine the optical distortion. The process begins with minimization of lens distortion. Minimizing lens distortion is important to remove the lens effects from the variability in optical distortion of the target object being measured, such as a laminated aircraft windshield. Once lens distortion is minimized, regions of interest are defined, where there are regions viewed through the target object are inside the region of interest (iROI) and regions not viewed through the target object are outside the region of interest (oROI). The target object is disposed between the lens and a grid such that the lens views the grid inside the region of interest and outside the region of interest. The grid line intersection points are measured in an image captured by the lens, where pixel values are established for each grid line intersection or vertex.

The process continues by using each grid line intersection point in the area outside the region of interest to fit horizontal and vertical grid lines using a least-squares fit of the horizontal and vertical lines. This is done via interpolation where able, and extrapolation at least. The resulting least-squares fit equations are used to produce virtual grid line intersection points for the area inside the region of interest. The virtual grid line intersection points are quantitively compared with a nearest-neighbor grid line intersection point found inside the region of interest. From the quantitive comparison, optical distortion can be computed.

According to some embodiments, a grid board is not necessary and instead a known pattern that is well-understood may be used instead. With this technique, known point(s) of the area inside the region of interest are set as basis, and distortion is computed through quantitive comparison between measured known points of interest within the region of interest against where they would be absent the target object (e.g., windshield) per the known geometry.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for determining optical distortion of a transparent object from an image. The apparatus 20 may be equipped or associated with any number of sensors 21, such as an image capture sensor, Light Distancing and Ranging (LiDAR) sensor, or other imaging sensors. Any of the sensors may be used to sense information associated with a transparent object to establish optical distortion in the object.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device such as the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus.

Optical distortion in vehicle windshields can be problematic for drivers or pilots of the vehicle, along with any occupants. Optical distortion of a windshield of a vehicle can distort the environment viewed through the windshield, thereby making it difficult to accurately control the vehicle and to determine spatial relationships with objects in the environment. Further, optical distortion can induce illness in a driver/pilot or occupant of a vehicle through nausea, headaches, or the like. It is preferable to minimize optical distortion of transparent objects, and particularly vehicle windshields. Embodiments provided herein include a method and apparatus for determining optical distortion, and more particularly, to measuring and quantifying optical distortion of a transparent object using a single image.

To quantify and measure optical distortion of transparent objects using a single image, embodiments described herein first minimize distortion that is not due to the transparent object. To that end, distortion of the lens of the image capture device (e.g., sensor 21 of FIG. 1) is minimized to reduce the effect of lens distortion on the analysis and measurement of distortion of the transparent object. FIG. 2 illustrates an example system for quantifying and measuring distortion of a transparent object. As shown, a transparent object 100, such as a windshield, is positioned between an image capture device 105 and an object of known geometry 110. The transparent object 100 is supported on a test stand 135 to be positioned between the image capture device 105 and the object of known geometry 110. The image capture device 105 is a high-resolution digital image capture device suitable for capturing well-defined images of the object of known geometry 110 for further analysis as described below.

The illustrated embodiment of FIG. 2 depicts a transparency test grid as the object of known geometry 110. The test grid is of one-inch spaced lines in accordance with ASTM Standard F733-19 for optical distortion analysis. Parameters such as the distance to the test grid, lighting conditions, viewing positions, and viewing angles are controlled during distortion analysis and measurement. Using methods and systems as described herein, an objective acceptance criteria for the distortion of transparent objects is established and the optical distortion can be repeatably and reliably quantified and measured using a single image of the transparent object 100 and the object of known geometry 110.

FIG. 3 illustrates the system of FIG. 2 in profile illustrating the sight lines of the image capture device 105. The transparent object 100 and the object of known geometry 110 are in the field-of-view 120 of a lens 115 of the image capture device 105. Within the field-of-view 120 of the image capture device 105, the object of known geometry 110 is visible through the transparent object 100 as shown by optical path 125, while at least a portion of the object of known geometry is visible without the transparent object between the image capture device 105 and the object of known geometry, as shown along optical path 130.

FIG. 4 illustrates the system of FIGS. 2 and 3 as shown from the viewpoint of the image capture device 105. As shown, the object of known geometry 110 is a grid board having a grid laid out on a flat surface with a plurality of intersecting horizontal and vertical lines. The transparent object 100 is illustrated in front of the object of known geometry 110, where at least a portion of the object of known geometry is visible through the transparent object 100. The portion of the object of known geometry visible through the transparent object is defined herein as the inside region of interest (iROI) 150, while the portion of the object of known geometry 110 visible unobscured by the transparent object 100 is defined herein as the outside region of interest (oROI) 160.

Before a determination is made as to the optical distortion present in the transparent object, it is desirable to account for any other sources of optical distortion. For example, the image capture device 105 may capture images with some degree of distortion, which may be imparted by the lens 115 or optics of the image capture device. A calibration operation may be performed to remove optical distortion from the system. The calibration operation to remove or minimize distortion of the lens 115 or other portion of the image capture device 105 is performed using a baseline image of an object of known geometry without the transparent object obstructing the object of known geometry. It is first necessary to ensure that there is sufficient contrast to identify lines of the object of known geometry.

The calibration operation corrects for distortion in the form of pincushion and barrel distortion that may be imparted by the lens 115. Radial distortion due to the lens 115 can be caused by imperfections in the lens imparted during manufacture such as imperfections in curvature or inclusions in the lens material. According to an example embodiment, lens distortion can be represented by radial distortion coefficients k1, k2, k3, and k4. Parameters k1, k2, k3, and k4 are selected to minimize lens distortion. These can be determined empirically or provided by the lens manufacturer. To calibrate for lens distortion, the following equations may be employed:

$$uCORRECTED = \left(\left(k4 * \left(\sqrt{(u-uCENTER)^2 + (vCENTER-v)^2}\right)^4\right) - \right.$$
$$\left(k3 * \left(\sqrt{(u-uCENTER)^2 + (vCENTER-v)^2}\right)^3\right) +$$
$$\left(k2 * \left(\sqrt{(u-uCENTER)^2 + (vCENTER-v)^2}\right)^2\right) +$$
$$\left(k1 * \left(\sqrt{(u-uCENTER)^2 + (vCENTER-v)^2}\right)\right) *$$
$$\left. \text{sign}(u-uCENTER) * \left|\left(\cos\left(\tan^{-1}\left(\frac{vCENTER-v}{u-uCENTER}\right)\right)\right)\right| + uCENTER \right.$$

$$vCORRECTED =$$
$$vCenter - \left(\left(k4 * \left(\sqrt{(u-uCENTER)^2 + (vCENTER-v)^2}\right)^4\right) - \right.$$
$$\left(k3 * \left(\sqrt{(u-uCENTER)^2 + (vCENTER-v)^2}\right)^3\right) +$$
$$\left(k2 * \left(\sqrt{(u-uCENTER)^2 + (vCENTER-v)^2}\right)^2\right) +$$
$$\left(k1 * \left(\sqrt{(u-uCENTER)^2 + (vCENTER-v)^2}\right)\right) *$$
$$\left. \text{sign}(vCENTER-v) * \left|\left(\sin\left(\tan^{-1}\left(\frac{vCENTER-v}{u-uCENTER}\right)\right)\right)\right| \right.$$

Where "u" is horizontal pixel location and "v" is vertical pixel location, uCORRECTED is the corrected (calibrated) horizontal pixel location, vCORRECTED is the corrected (calibrated) vertical pixel location, uCENTER is the horizontal center pixel location, and vCENTER is the vertical center pixel location. As the object of known geometry 110 that is not obstructed by the transparent object 100 may not be at the center of the captured image, iteration may be required. Parameters k1, k2, k3, and k4 may be adjusted as necessary.

With the lens distortion known, the lens distortion can be mitigated such that distortion observed through the transparent object can be attributed exclusively to the transparent object. Once lens distortion is minimized, regions of interest can be defined. As shown in FIG. 4, the iROI 150 and the oROI 160 can be defined. Defining the regions of interest after calibration of the lens ensures more accurate definition of the regions of interest. While the optical distortion is to be quantified and measured within the iROI 150, the features found in the oROI 160 are used to establish the distortion within the iROI. These features, in the illustrated embodiment of FIGS. 2-4, are the gridlines of the grid board that is the object of known geometry 110.

According to an example embodiment in which the grid board is the object of known geometry 110, for each gridline intersection point in the iROI 150 and the oROI 160 visible in the image, the intersection point (u,v) is measured in pixel values. The gridline intersection points are identified in the image as identified pixels. The intersection point for each gridline is defined by an identified pixel having a pixel location where the gridlines are observed in the image to intersect. These locations may be established through image processing software, for example. Optionally, the image captured may be processed by a machine learning algorithm to identify gridline intersection points within the image, and the pixel values for each of these points can then be defined. While example embodiments described herein generally employ a grid board having gridlines as the object of known geometry 110, embodiments may use other objects for the same purpose. Objects of known geometry, such as the grid board shown, require distinct points that can be identified in an image of the object of known geometry. In the grid board example, the distinct points include the gridline intersections. The gridlines and grid intersection points can be correlated with straight lines and specified points within any object (e.g. vertices of an object). As such, while a grid board and gridlines are described in the primary embodiment below, any such object of known geometry 110 may be used.

Embodiments described herein may be implemented in a variety of software languages and may embody the image processing software, with code running in MATLAB, Mathematica, and/or image processing software packages (e.g., edge detection, intersection detection, etc.). The value for each grid line intersection (u,v) pixel location is established after the calibration that removes lens distortion, such that the value for each gridline intersection is actually (uCORRECTED, vCORRECTED). However, values for pixel locations will be described herein as (u,v) in a post-calibration location or where distortion does not exist. The value "u" is the horizontal pixel value measured from the left edge of the image which has a value of zero for u. The value "v" is the vertical pixel value measured from the top edge, where the top edge has a value of zero for v. The values for each gridline pixel location are then stored, such as in memory 26 of apparatus 20 of FIG. 1. The (u,v) pixel location for the gridline intersections in the oROI 160 are the actual locations of the gridline intersections. The (u,v) pixel location for the gridline intersections in the iROI 150 are measured gridline intersection locations from the captured image where optical distortion may be present.

Using the (u,v) location for each oROI gridline intersection point, a least-squares fit of the gridlines (horizontal and vertical) may be performed via interpolation and if necessary, extrapolation. While the terms horizontal and vertical are used herein to describe the gridlines, the lines are not necessarily horizontal and vertical with respect to the Earth frame-of-reference. The gridlines can be any orientation and achieve the same goals as described herein. Further, while the primary embodiment described herein uses a grid of perpendicular lines, embodiments may use grids of any consistent geometry for the same purpose. Thus, the terms "horizontal" and "vertical" are examples of line orientation and are not exclusive of other line orientations.

Using the least-squares fit of the gridlines, virtual gridlines can be generated within the iROI that represent continuations of the gridlines of the oROI. These virtual gridlines include virtual gridline intersection points established using the gridlines in the oROI. As described further below, the virtual gridline intersection points can be used to quantify and measure optical distortion in the transparent object 100.

Based on the position of the transparent object 100 relative to the object of known geometry 110, interpolation may be possible to generate the virtual gridlines, while extrapolation may be necessary in some circumstances. Interpolation, as used herein, is more reliable and accurate than extrapolation, such that interpolation is preferable when possible. As shown in FIG. 5, gridlines and intersections of the object of known geometry 110 in the oROI 160 are found on all sides of the transparent object 100. In this scenario, interpolation may be used for both the vertical and horizontal gridlines to generate the virtual gridlines in the iROI 150. As shown in the embodiment of FIG. 6, the transparent object 100 is on the right edge of the object of known geometry 110. As there are no gridline intersection points to the right of a portion of the transparent object 100 within the oROI 160, extrapolation must be used to generate the horizontal virtual gridlines of the iROI 150 for at least a portion of the iROI. Since there are gridline intersection points in the oROI 160 above and below the transparent object 100, interpolation may be used in the vertical direction.

FIG. 7 illustrates the transparent object 100 at the top edge of the object of known geometry 110. Since there are no gridline intersection points above at least a portion of the transparent object 100 in the oROI 160, extrapolation must be employed to generate the virtual vertical gridlines in the iROI 150 for at least a portion of the iROI. As gridline intersection points are present in the oROI 160 on either side of the transparent object 100, interpolation may be used for the virtual gridlines of the iROI in the horizontal direction. FIG. 8 illustrates an embodiment in which the transparent object 100 is at the top edge and the right edge of the object of known geometry 110. As there are no gridline intersection points above at least a portion of the transparent object 100 or along a side of at least a portion of the transparent object in the oROI 160, interpolation must be used for at least some of the horizontal and vertical virtual gridlines of the iROI 150 for at least a portion of the iROI.

FIG. 9 illustrates an extreme example where at least a portion of all sides of the transparent object 100 lack gridline intersection points in the oROI 160. In this scenario, incomplete gridlines must be replicated by slope and spacing in the oROI 160 to generate virtual gridlines an intersection points.

The illustrated embodiments of FIGS. 5-9 depict ideal horizontal and vertical lines; however, actual images may include lines in the oROI 160 that have at least some skew where there is some non-zero slope in the horizontal and some non-infinite slope in the vertical direction. Embodiments described herein accommodate such non-ideal factors since the fitting of lines does not require purely vertical or horizontal lines.

The resultant least-squares fit equations for the gridlines produces virtual gridlines and virtual gridline intersection points (u,v) within the iROI. FIG. 10 illustrates an example embodiment of a grid board object of known geometry 110 and a transparent object 100 with the gridlines in the iROI 150 removed for illustrative purposes. A least squares fit of lines from the oROI 160 produces virtual lines within the iROI 150, where a virtual gridline intersection point 200 is shown. To establish the virtual gridline intersection points, the following equations are solved simultaneously:

$v = a_m u + b_m$ (vertically spaced gridlines)

$u = c_n v + d_n$ (horizontally spaced gridlines)

wherein m is a horizontal line counter (an integer value), n is a vertical line counter (an integer value), and for each m and n the parameters $a_m$, $b_m$, $c_n$, and $d_n$ are known values from the aforementioned least-squares fitting process.

Determining the virtual gridline intersection point is done for each pair of virtual vertical and horizontal gridlines found within the iROI 150. This produces a plurality of virtual gridline intersection points as shown in FIG. 11, where the gridlines of the oROI 160 have been interpolated to establish gridlines and gridline intersection points of the iROI 150. The intersections of these lines are calculated as described above to be used for quantifying and measuring optical distortion in the transparent object 100.

Virtual gridline intersections represent the gridline intersections viewed without the transparent object 100 in place or the ideal transparency with zero optical distortion. These virtual gridline intersections can be compared against the measured gridline intersections visible in the captured image in the iROI 150 captured through the transparent object 100. A virtual gridline intersection overlaying a corresponding measured gridline intersection in the iROI 150 would indicate an absence of distortion in the transparency under analysis. This occurs when the (u,v) pixel location of the virtual gridline intersection is equal to the (u,v) pixel location of the corresponding measured gridline intersection in the iROI 150. When the (u,v) pixel location of the virtual gridline intersection does not equal the (u,v) pixel location of the corresponding measured gridline intersection, a displacement vector is computed between the locations. This displacement vector represents the distortion, where divergence of the displacement vector field (e.g., for all gridline intersection points) corresponds to the optical distortion profile of the transparent object 100.

FIG. 12 illustrates measured gridlines shown in solid lines superimposed over virtual gridlines within the iROI 150 illustrated in dashed lines. The measured gridlines of the captured image generally overlie the virtual gridlines for most of the iROI 150 in the illustrated embodiment other than for an optically distorted region 210. FIG. 13 illustrates an enlarged view of the distorted region with the measured gridlines 215 from the captured image and the virtual gridlines 220 calculated as described above. While the vertices or intersections of the gridlines may be the only measured points of the captured image, and the only calculated points of the virtual gridlines, the gridlines may be established from these intersection points. As shown in FIG. 13, the virtual gridlines 220 are undistorted, while the measured gridlines 215 are distorted in distorted region 210. Displacement vectors are calculated between virtual gridline intersections and measured gridline intersections. These vectors are more clearly illustrated in FIG. 14 where the measured gridlines 215 have been omitted. As shown, some displacement vectors are relatively small, indicating a lower degree of distortion, such as vector 230. Other displacement vectors are relatively large indicating a larger degree of distortion, such as vector 235 and vector 240.

The displacement vectors relating to the distortion include an x-direction component and a y-direction component. The sum of the rate of the x-direction component change in the x-direction and the rate of the y-direction component change in the y-direction corresponds to the optical distortion present. The sum of the rate of the x-direction component change in the x-direction and the rate of the y-direction component change in the y-direction are the mathematical divergence of the respective vectors.

Embodiments described herein quantitatively compare the nearest virtual gridline intersection location and the measured gridline intersection location within the iROI 150 to compute and measure the optical distortion. The virtual gridline intersection may correspond to a measured gridline intersection that is not the closest measured gridline intersection when optical distortion is substantial. To establish correspondence between a measured gridline intersection and a virtual gridline intersection, gridline counters may be used where each gridline is uniquely identified, and correspondence between the oROI 160 and the iROI 150 may be confirmed prior to generating displacement vectors. Optionally, gridline intersection points may be counted, such as by the image processing software, progressing from an origin point in the grid, such as at a corner. A next grid point encountered in each direction emanating from the corner may increment the counter, assigning an identifier to each gridline intersection. This may be performed for the virtual gridline intersection points and the measured gridline intersection points, such that corresponding pairs of gridline intersection points may be identified.

FIG. 15 illustrates a flowchart depicting a method according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 15 is a flowchart of a method for measuring and quantifying optical distortion of a transparent object using a single image. As shown, an image of an object of known geometry and a transparent object is received at 310. The object of known geometry has distinct points and is visible through the transparent object. The portion of the image of the object of known geometry visible through the transparent object is an inside region of interest (iROI) where a portion of the image of the object of known geometry not viewed through the transparent object is an outside region of interest (oROI). Measured pixel locations for a plurality of identified pixels in the image are determined at 320. The plurality of identified pixels corresponding to the distinct points of the object of known geometry. Virtual locations in the image representing the distinct points of the object of known geometry within the iROI are calculated at 330. This may be performed, for example, by using a least squares fit. At 340, differences between the virtual location and the measured pixel location are determined for respective distinctive points of the object of known geometry within the iROI. Optical distortion of the transparent object is established at 350 based on the differences between the virtual locations and the measured pixel locations of the distinct points.

In an example embodiment, an apparatus for performing the method of FIG. 15 above may comprise a processor (e.g., the processor 24) configured to perform some or each of the operations (310-350) described above. The processor may, for example, be configured to perform the operations (310-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-350 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an image of an object of known geometry and a transparent object, wherein the object of known geometry has distinct points and is visible through the transparent object, wherein a portion of the image of the object of known geometry visible through the transparent object is an inside region of interest (iROI), and wherein a portion of the image of the object of known geometry not viewed through the transparent object is an outside region of interest (oROI);
   determining measured pixel locations for a plurality of identified pixels in the image, the plurality of identified pixels corresponding to the distinct points of the object of known geometry in the image;
   calculating virtual locations in the image representing the distinct points of the object of known geometry within the iROI;
   determining, for respective distinct points of the object of known geometry within the iROI, differences between the virtual location and the measured pixel location, based, at least in part, on a location of the plurality of identified pixels corresponding to the distinct points of the object of known geometry in the image in the oROI; and establishing optical distortion of the transparent object based on the differences between the virtual locations and the measured pixel locations of the distinct points.

2. The method of claim 1, wherein the virtual locations in the image representing the distinct points of the object of known geometry within the iROI comprise locations in the image where the distinct points of the object of known geometry would be located if the transparent object was not present in the image.

3. The method of claim 2, wherein calculating virtual locations in the image representing the distinct points of the object of known geometry within the iROI comprises performing a least squares fit of intersecting lines based on measured pixel locations for the plurality of identified pixels in the image in the oROI.

4. The method of claim 3, wherein the object of known geometry comprises a grid board having a plurality of perpendicular gridlines intersecting at gridline intersection points, wherein the distinct points comprise gridline intersection points.

5. The method of claim 4, wherein performing a least squares fit of intersecting lines based on measured pixel locations for the plurality of identified pixels in the image in the oROI comprises performing a least squares fit of the plurality of perpendicular gridlines to establish gridline intersection points within the iROI as the virtual locations in the image representing the gridline intersection points.

6. The method of claim 1, further comprising: minimizing distortion of a lens of an image capture device having captured the image of the object of known geometry and the transparent object before determining measured pixel locations.

7. The method of claim 1, wherein the differences between the virtual locations and the measured pixel locations comprise vectors, each vector having a magnitude defining a degree of the optical distortion and a direction defining a direction of the optical distortion.

8. An apparatus comprising at least one processor and at least one non-transitory memory including computer program code instructions, the computer program code instructions configured to, when executed, cause the apparatus to at least:

receive an image of an object of known geometry and a transparent object, wherein the object of known geometry includes distinct points and is visible through the transparent object, wherein a portion of the image of the object of known geometry visible through the transparent object is an inside region of interest (iROI), and wherein a portion of the image of the object of known geometry not viewed through the transparent object is an outside region of interest (oROI);

determine measured pixel locations for a plurality of identified pixels in the image, the plurality of identified pixels corresponding to the distinct points of the object of known geometry in the image;

calculate virtual locations in the image representing the distinct points of the object of known geometry within the iROI;

determine, for respective distinct points of the object of known geometry within the iROI, differences between the virtual location and the measured pixel location, based, at least in part, on a location of the plurality of identified pixels corresponding to the distinct points of the object of known geometry in the image in the oROI; and establish optical distortion of the transparent object based on the differences between the virtual locations and the measured pixel locations of the distinct points.

9. The apparatus of claim 8, wherein the virtual locations in the image representing the distinct points of the object of known geometry within the iROI comprise locations in the image where the distinct points of the object of known geometry would be located if the transparent object was not present.

10. The apparatus of claim 9, wherein causing the apparatus to calculate virtual locations in the image representing the distinct points of the object of known geometry within the iROI comprises causing the apparatus to perform a least squares fit of intersecting lines based on measured pixel locations for the plurality of identified pixels in the image in the oROI.

11. The apparatus of claim 10, wherein the object of known geometry comprises a grid board having a plurality of perpendicular gridlines intersecting at gridline intersection points, wherein the distinct points comprise gridline intersection points.

12. The apparatus of claim 11, wherein causing the apparatus to perform a least squares fit of intersecting lines based on measured pixel locations for the plurality of identified pixels in the image in the oROI comprises causing the apparatus to perform a least squares fit of the plurality of perpendicular gridlines to establish virtual gridline intersection points within the iROI as the virtual locations in the image representing the gridline intersection points.

13. The apparatus of claim 8, further comprising causing the apparatus to minimize distortion of a lens of an image capture device having captured the image of the object of known geometry and the transparent object.

14. The apparatus of claim 8, wherein the differences between the virtual locations and the measured pixel locations comprise vectors, each vector having a magnitude defining a degree of the optical distortion and a direction defining a direction of the optical distortion.

15. A computer program product comprising at least one non-transitory computer-readable storage medium having computer-executable program code instructions stored therein, the computer-executable program code instructions comprising program code instructions to:

receive an image of an object of known geometry and a transparent object, wherein the object of known geometry has distinct points and is visible through the transparent object, wherein a portion of the image of the object of known geometry visible through the transparent object is an inside region of interest (iROI), and wherein a portion of the image of the object of known geometry not viewed through the transparent object is an outside region of interest (oROI);

determine measured pixel locations for a plurality of identified pixels in the image, the plurality of identified pixels corresponding to the distinct points of the object of known geometry in the image;

calculate virtual locations in the image representing the distinct points of the object of known geometry within the iROI;

determine, for respective distinct points of the object of known geometry within the iROI, differences between the virtual location and the measured pixel location, based, at least in part, on a location of the plurality of identified pixels corresponding to the distinct points of the object of known geometry in the image in the oROI; and establish optical distortion of the transparent object based on the differences between the virtual locations and the measured pixel locations of the distinct points.

16. The computer program product of claim 15, wherein the virtual locations in the image representing the distinct points of the object of known geometry within the iROI comprise locations in the image where the distinct points of the object of known geometry would be located if the transparent object was not present.

17. The computer program product of claim 16, wherein the program code instructions to calculate virtual locations in the image representing the distinct points of the object of known geometry within the iROI comprise program code instructions to perform a least squares fit of intersecting lines based on measured pixel locations for the plurality of identified pixels in the image in the oROI.

18. The computer program product of claim 17, wherein the object of known geometry comprises a grid board having a plurality of perpendicular gridlines intersecting at gridline intersection points, wherein the distinct points comprise gridline intersection points.

19. The computer program product of claim 18, wherein the program code instructions to perform a least squares fit of intersecting lines based on measured pixel locations for the plurality of identified pixels in the image in the oROI comprise program code instructions to perform a least squares fit of the plurality of perpendicular gridlines to establish virtual gridline intersection points within the iROI as the virtual locations in the image representing the gridline intersection points.

20. The computer program product of claim 15, further comprising program code instructions to minimize distortion of a lens of an image capture device having captured the image of the object of known geometry and the transparent object before determining the measured pixel locations.

* * * * *